United States Patent
Fluck et al.

(10) Patent No.: US 7,415,497 B2
(45) Date of Patent: Aug. 19, 2008

(54) METHOD AND APPARATUS FOR ASYNCHRONOUSLY TRANSFERRING AT LEAST ONE MESSAGE SIGNAL

(75) Inventors: Hans-Juergen Fluck, Karlsruhe (DE); Alexej Gerstmaier, Rheinstetten (DE); Martin Glaser, Ubstadt-Weiher (DE)

(73) Assignee: Siemens Aktiengesellschaft, Munich (DE)

( * ) Notice: Subject to any disclaimer, the term of this patent is extended or adjusted under 35 U.S.C. 154(b) by 956 days.

(21) Appl. No.: 10/697,241

(22) Filed: Oct. 31, 2003

(65) Prior Publication Data

US 2004/0136369 A1    Jul. 15, 2004

(30) Foreign Application Priority Data

Oct. 31, 2002    (EP)    .................. 02024267

(51) Int. Cl.
G06F 15/16    (2006.01)

(52) U.S. Cl. .................. 709/203; 709/217; 709/219; 709/230; 709/231

(58) Field of Classification Search .................. 709/203, 709/217, 219, 231, 230; 700/83; 717/716
See application file for complete search history.

(56) References Cited

U.S. PATENT DOCUMENTS

| 5,928,323 | A | * | 7/1999 | Gosling et al. | .............. 709/203 |
| 6,061,603 | A | * | 5/2000 | Papadopoulos et al. | ....... 700/83 |
| 6,546,554 | B1 | * | 4/2003 | Schmidt et al. | ............. 709/203 |

FOREIGN PATENT DOCUMENTS

| DE | 10154262 | 10/2002 |
| WO | WO0062136 | 10/2000 |

* cited by examiner

*Primary Examiner*—Quang N. Nguyen
(74) *Attorney, Agent, or Firm*—Harness, Dickey & Pierce

(57) ABSTRACT

In a client/server computer architecture, a message signal appearing on a server computer is assigned a further message signal and the latter is written to a pipe and transmitted to a servlet on the server computer via the pipe. The further message signal is then transferred to a client computer via a transfer channel by way of the servlet. Here, the message signal is decoupled from the corresponding further message signal, with the fate of the message signal after it has appeared no longer directly influencing the fate of the associated message signal.

15 Claims, 1 Drawing Sheet

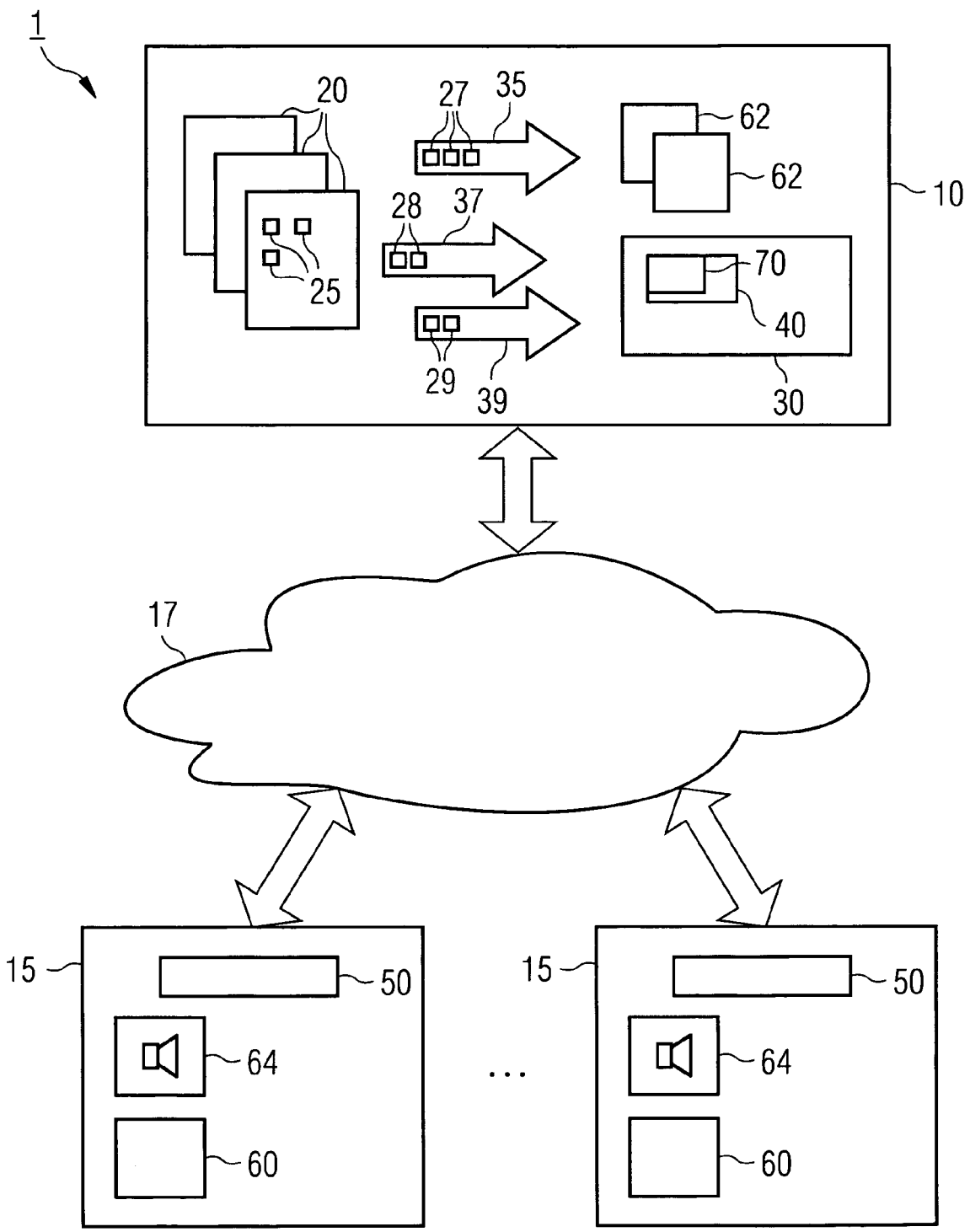

METHOD AND APPARATUS FOR ASYNCHRONOUSLY TRANSFERRING AT LEAST ONE MESSAGE SIGNAL

The present application hereby claims priority under 35 U.S.C. §119 on European patent application number EP 02024267.3 filed Oct. 31, 2002, the entire contents of which are hereby incorporated herein by reference.

FIELD OF THE INVENTION

The invention generally relates to a method and an apparatus for asynchronously transferring at least one message signal in a client/server architecture, particularly within a command system implemented by way of such an architecture.

BACKGROUND OF THE INVENTION

On account of Internet technology, which has been progressing further and further particularly in recent times, and all the associated communication and application solutions, it is possible even in command systems for controlling and observing a technical installation to spot the trend for developing such command systems by incorporating methods and solutions from the field of Internet technology.

The particular effect which is intended to be achieved by this is that the control stations (operator terminals) in the command system become largely locally independent of the site of the technical installation. In addition, the intention is for it no longer to be necessary to install special control and observation software on the control stations in order to be able to control the technical installation. A client computer with an installed web browser will be sufficient for this.

Such a command system allows a technical installation to be controlled remotely, and in many cases the control room within the technical installation no longer needs to be occupied or no longer needs to be occupied all the time.

In many known command systems, alarms within the technical installation are often reported not only by way of visual display, for example on a screen or a large screen, but also audibly, for example by way of a signal horn or a claxon. This, at least when an alarm message requiring rapid action appears, emits a loud tone at a particular frequency in order to give a clear indication to personnel present in the technical installation that there is an urgent need for action.

In an unmanned or only intermittently occupied control room, an audible alarm is inevitably often unnoticed.

In command systems which make use of Internet technology, a connection from a control station to a server computer in the command system is set up usually only when needed, for example in order to perform a control action or to assure oneself of the current operating state of the technical installation.

Such command systems usually have no provision for asynchronous transfer of messages from the server computer to a client computer (control station in the command system). Thus, in such command systems, it is essentially possible to transfer only such messages/signals to a control station (client computer) as are waiting on the server computer at the time of a connection existing between the control station and the server computer.

SUMMARY OF THE INVENTION

An embodiment of the invention is therefore based on an object of specifying a method and an apparatus for asynchronously transferring at least one message signal which improve the communication between a server computer and a client computer.

For the method, an embodiment of the invention achieves the object by way of a method for asynchronously transferring at least one message signal from a server computer to at least one client computer which comprises the following steps:

1. when the message signal appears on the server computer, the message signal is assigned at least one further message signal,
2. the further message signal is written to at least one pipe which the server computer includes as a communication device,
3. the further message signal is transmitted by way of the pipe to at least one servlet which the server computer includes, and
4. the further message signal is transferred by way of the servlet to the client computer via a transfer channel.

In this case, an embodiment of the invention is based on the consideration that, in a server/client architecture for a computer system, particularly when the transfer channel involved is the Internet, asynchronous transfer of messages/signals from the server computer to the client computer is necessary in order to recognize all important signals/messages quickly and to identify them with certainty using the client computer.

If there is no such opportunity for data transfer, then the client computer can recognize such signals and messages as have already arisen on the server computer before a connection has been set up between client computer and server computer only with difficulty, and in particular cannot do so quickly.

The inventive method now makes provision for the message signal, when it appears, to be assigned a further message signal and for the latter to be written to a pipe. Subsequently, the message signal is then not transmitted to the client computer directly, but rather the further message signal, which indicates that decoupling is achieved between the two signals.

In particular, the further message signal can also be used to transfer such a message signal to the client computer as is no longer waiting on the server computer at all at the time of a connection between the client computer and the server computer. In this respect, the message signal and the further message signal associated therewith are decoupled in terms of their later fate.

A pipe is a known communication device which is used for efficient communication between processes which take place within the same computer or on different computers connected by way of a network.

In addition, an application software program making use of a pipe for communication does not have to concern itself with details of the connection setup to a remote computer. This is because the known pipe communication includes a customary client/server architecture, with a process which generates a pipe client easily being able to communicate with a process which produces a pipe server.

In line with the inventive method, the further message signal is transmitted to at least one servlet by way of the pipe. The pipe is thus the device used for communication in order to set up a connection between a process which produces the further message signal and a further process, namely the servlet.

The servlet is a software program on the server computer which is used to implement at least part of the functionality of the server computer. Using a servlet affords, inter alia, the advantage that it remains resident in memory between various requests to the servlet, which means that it is not necessary to reload and start the servlet.

Furthermore, there is only one instance of the servlet. This instance processes all requests simultaneously, which saves memory space and allows the servlet to process continual data streams easily.

Finally, servlets are usually in the form of software modules which are created using the programming language Java and run within an application program on a server (which is also where the name "servlet" comes from). Servlets are thus not tied to one specific client/server protocol and are therefore independent of platform.

In one advantageous refinement of an embodiment of the invention, the client computer includes at least one communication software program which is used to set up a connection to the servlet and which is used to execute an audio program, which the server computer includes and which is associated with the further message signal, on the client computer. In this case of this refinement of an embodiment of the invention, it is particularly possible to transfer message signals which trigger an audible signal in the technical installation asynchronously to the client computer using the further message signal, in which case audible signaling takes place on the client computer.

The communication software program connects to the servlet and evaluates the incoming data such that audible signaling takes place on the client computer if needed. In this case, a corresponding audio program is executed on the client computer. Depending on the priority and/or type of a received further message signal, a plurality of audio programs can be provided, which indicates that simple and rapid classification of the message signal is possible on the basis of the sound pattern of the respective audio program.

Using this advantageous refinement of the inventive method, the audible signaling customary in the prior art within a technical installation is transferred to a configuration of the command system in which a control computer (client computer) is arranged outside the technical installation and the audible signaling takes place on this computer.

In another advantageous refinement, a connection from the client computer to the server computer is set up only when needed.

During operation of a technical installation, it is usually not necessary to maintain a continual connection between a central computer in the command system and the control computers. This is because action is taken in the technical installation from the control computer only intermittently, or information regarding the operating state of the technical installation is needed only intermittently.

In the case of such an architecture and manner of operation for a command system, the advantages of an inventive method for asynchronous data transfer become noticeable with particular clarity. This is because, in particular, there is the assurance that even such message signals as have already arisen before connection setup are transferred with certainty and quickly to the client computer. This overcomes at least one serious drawback of known command systems in which no provision is made for asynchronous transfer of message signals.

One particular advantage is that while the client computer is connected to the server computer, a first access operation by the client computer to the server computer prompts a communication program which the servlet includes to start, and further access operations by the client computer to the server computer prompt monitoring of whether the communication program is currently running.

This allows the servlet to transfer all arising message signals rapidly to one or more client computers using the corresponding further message signals without the need to load and start an auxiliary program each time there is access in order to transfer these data. The communication program in this embodiment is thus a software program which is used to read the data which are in the pipe, a first read access operation involving the communication program being set up and being kept active while a connection exists between client computer and server computer. Problems in reading data which are in the pipe are recognized by way of the cited monitoring of the communication program.

Advantageously, the communication program is used to transmit an identification information item for the pipe to the servlet.

Such "named pipes" can be used for particularly efficient communication, since it is possible to connect to a desired pipe specifically using said pipe's identification information item. This identification information item can include a descriptor (a name) and/or a software address for the pipe, for example.

In one particularly advantageous refinement of an embodiment of the invention, the transfer channel comprises at least part of the Internet and/or an intranet. In this way, it is possible to monitor a technical installation over almost unlimited distances, so long as an Internet connection is possible between the client computer and server computer.

Since a multiplicity of communication mechanisms have already become established in connection with Internet technology, a command system which makes use of such a distributed architecture is additionally relieved of the burden of communication tasks relating to data transfer between the server computer and the client computer. Furthermore, a client computer used in connection with this embodiment needs, in essence, only to comprise a known web browser (thin client). The actual functionality of such a command system is implemented in the server computer, which is operated as a web server. A popular transfer protocol which can be used in this embodiment is the http protocol, which can be processed as standard by popular web browsers.

BRIEF DESCRIPTION OF THE DRAWINGS

The present invention will become more fully understood from the detailed description of preferred embodiments given hereinbelow and the accompanying drawing, which is given by way of illustration only and thus is not limitative of the present invention, and wherein:

The FIGURE shows an apparatus in accordance with an embodiment of the invention with incorporation of the Internet.

DETAILED DESCRIPTION OF THE PREFERRED EMBODIMENTS

An apparatus 1 in accordance with an embodiment of the invention includes, as fundamental parts, a server computer 10, a transfer channel 17 provided by the Internet and a number of client computers 15.

In this context, the communication between the server computer 10 and the client computer 15 is preferably handled by way of known communication mechanisms such as the http protocol. To link the client computers 15 to the transfer channel 17, the client computers 15 each comprise a known web browser 60.

The server computer 10 includes the functionality of a known web server.

The server computer 10 processes a number of server tasks 20 which can include one or more message signals 25 which need to be transferred to at least one client computer 15. Such message signals 25 can include, by way of example, alarm messages which arise when a technical installation is operated.

In this case, to transfer the message signals 25, at least one message signal 25 is assigned at least one further message signal 27, 28, 29 which is written to at least one pipe 35, 37, 39. At least one further message signal 27, 28, 29 has at least one associated audio program 62 whose sound content is characteristic of the corresponding further message signal.

The server computer 10 also includes a servlet container 30 which includes at least one servlet 40.

The further message signals 27, 28, 29 are transmitted to the servlet 40 by way of the pipe 35, 37, 39 and are transferred to at least one client computer 15 via the transfer channel 17.

The servlet 40 includes a communication program 70 which, while at least one client computer 15 is connected to the server computer 10, is started upon a first access operation by the client computer. It is also monitored upon further access operations in order to determine whether it is active.

It is therefore not necessary to load and start an auxiliary program during a connection whenever there is access by a client computer 15. Instead, the communication program 70 remains active during the connection and is continually monitored during the connection for its activity, which makes rapid error recognition possible.

One or more client computers 15 have a sound reproduction device 64 which includes, by way of example, a commercially available sound card and a loudspeaker. These allow message signals 25 for which audible signaling is desired to be presented audibly on the client computer 15.

The connection from one of the client computers 15 to the server computer 10 via the transfer channel 17 is set up on the client computer 15 using a communication software program 50. The communication software program 50 is used to contact the servlet 40. The communication software program 50 can preferably also be used to execute the audio programs 62 associated with the server computer 10 on the client computer 15; the communication software program 50 can in this case be part of the web browser and can contain known Internet communication mechanisms which are in widespread use.

It can be seen that an apparatus in accordance with an embodiment of the invention can be used for asynchronous transfer of message signals, which becomes noticeable with particular advantage in the case of audible remote alarm raising over the Internet.

In summary, an embodiment of the invention can be outlined as follows: in a client/server computer architecture, it is proposed that a message signal (25) appearing on a server computer (10) be assigned a further message signal (27, 28, 29) and that the latter be written to a pipe (35, 37, 39) and transmitted to a servlet (40) on the server computer (10) by way of the pipe. The further message signal (27, 28, 29) is then transferred to a client computer (15) via a transfer channel (17) by way of the servlet (40).

One advantage of the inventive method and apparatus is that the message signal may be decoupled from the corresponding further message signal, with the fate of the message signal (25) after it has appeared no longer directly influencing the fate of the associated message signal (27, 28, 29).

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for asynchronously transferring at least one message signal from a server computer to at least one client computer, comprising:
   assigning the at least one message signal, when the at least one message signal appears on the server computer, at least one further message signal;
   writing the at least one further message signal to at least one pipe of the server computer;
   transmitting the at least one further message signal, via the at least one pipe, to at least one servlet of the server computer;
   using at least one communication software program on the at least one client computer to set up a connection to the servlet of the server computer and to execute an audio program, which the server computer includes and which is associated with the further message signal; and
   transferring the at least one further message signal from the at least one servlet to the at least one client computer via the connection,
   wherein a fate of the at least one message signal and the at least one further message signal are decoupled, and
   wherein a sound content of the audio program is characteristic of the associated at least one further message signal.

2. The method as claimed in claim 1, wherein a connection from the client computer to the server computer is set up only when needed.

3. The method as claimed in claim 2, wherein, while the client computer is connected to the server computer, a first access operation by the client computer to the server computer prompts a communication program of the servlet to start, and further access operations by the client computer to the server computer prompt monitoring of whether the communication program is currently running.

4. The method as claimed in claim 3, wherein the communication program is used to transmit an identification information item for the pipe to the servlet.

5. The method as claimed in claim 4, wherein the identification information item includes at least one of a descriptor and a software address for the pipe.

6. The method as claimed in claim 1, wherein, while the client computer is connected to the server computer, a first access operation by the client computer to the server computer prompts a communication program of the servlet to start, and further access operations by the client computer to the server computer prompt monitoring of whether the communication program is currently running.

7. The method as claimed in claim 6, wherein the communication program is used to transmit an identification information item for the pipe to the servlet.

8. The method as claimed in claim 7, wherein the identification information item includes at least one of a descriptor and a software address for the pipe.

9. The method as claimed in claim 1, wherein the connection includes a transfer channel, including at least part of at least one of the Internet and an intranet.

10. An apparatus for asynchronously transferring at least one message signal, comprising:
    a server computer, including at least one pipe, adapted to assign the at least one message signal, when it appears on the server computer, a further message signal and adapted to write the further message signal to the at least one pipe;

at least one servlet of the server computer, to which the further message signal is adapted to be transmitted via the at least one pipe;

a transfer channel; and at least one client computer, to which the further message signal is adapted to be transferred by the server computer using the servlet, wherein the at least one client computer includes a communication software program, adapted to setup a connection to the servlet of the server computer and adapted to execute an audio program, which the server computer includes and which is associated with the further message signal, wherein a fate of the at least one message signal and the at least one further message signal are decoupled, and wherein a sound content of the audio program is characteristic of the associated at least one further message signal.

11. The apparatus as claimed in claim 10, wherein the servlet includes a communication program adapted be executed upon a first access operation by the client computer on the server computer and adapted to be checked upon further access operations by the client computer to the server computer in order to determine whether it is currently running.

12. The apparatus as claimed in claim 11, wherein the communication program is adapted to be used to transmit an identification information item for the pipe to the servlet.

13. The apparatus as claimed in claim 12, wherein the identification information item includes at least one of a descriptor and a software address for the pipe.

14. The apparatus as claimed in claim 10, wherein the transfer channel includes at least part of at least one of the Internet and an intranet.

15. A server computer for asynchronously transferring at least one message signal, comprising:

at least one pipe, wherein the server computer is adapted to assign the at least one message signal, when it appears on the server computer, a further message signal and is adapted to write the further message signal to the at least one pipe; and at least one servlet of the server computer, to which the further message signal is adapted to be transmitted via the pipe, wherein the further message signal is adapted to be transferred to a client computer by the server computer using the servlet, wherein the client computer includes a communication software program, adapted to setup a connection to the servlet of the server computer and adapted to execute an audio program, which the server computer includes and which is associated with the further message signal, wherein a fate of the at least one message signal and the at least one further message signal are decoupled, and wherein a sound content of the audio program is characteristic of the associated at least one further message signal.

* * * * *